(12) United States Patent
Saito et al.

(10) Patent No.: US 7,559,581 B2
(45) Date of Patent: Jul. 14, 2009

(54) COUPLING STRUCTURE FOR PIPE END

(75) Inventors: Hideo Saito, Akashi (JP); Kazumasa Hisada, Lincoln, NE (US); Fumio Mizuta, Akashi (JP); Masaru Oda, Lincoln, NE (US); Kenji Kimura, Lincoln, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 21 days.

(21) Appl. No.: 11/408,998

(22) Filed: Apr. 24, 2006

(65) Prior Publication Data

US 2006/0244259 A1    Nov. 2, 2006

(30) Foreign Application Priority Data

Apr. 25, 2005    (JP)    ............... P2005-126549

(51) Int. Cl.
*F16L 33/01*    (2006.01)
*F16L 33/22*    (2006.01)

(52) U.S. Cl. .................. 285/331; 285/252; 285/259; 285/903

(58) Field of Classification Search ............. 285/331, 285/903, 242, 252, 253, 254, 255, 256, 259
See application file for complete search history.

(56) References Cited

U.S. PATENT DOCUMENTS

| | | | | | |
|---|---|---|---|---|---|
| 3,073,629 | A | * | 1/1963 | De Marco | 285/256 |
| 3,408,091 | A | * | 10/1968 | Zylstra | 285/7 |
| 3,493,251 | A | * | 2/1970 | Kramer | 285/260 |
| 3,958,818 | A | * | 5/1976 | Mason | 285/92 |
| 4,225,162 | A | * | 9/1980 | Dola | 285/139.1 |
| 4,400,022 | A | * | 8/1983 | Wright | 285/256 |
| 4,625,998 | A | * | 12/1986 | Draudt et al. | 285/7 |
| 4,739,828 | A | * | 4/1988 | Bayer et al. | 165/173 |
| 4,763,932 | A | * | 8/1988 | Matz et al. | 285/148.17 |
| 4,819,972 | A | * | 4/1989 | Champa et al. | 285/331 |
| 4,907,830 | A | * | 3/1990 | Sasa et al. | 285/91 |

(Continued)

FOREIGN PATENT DOCUMENTS

DE    3800655 A1 *    7/1989

(Continued)

*Primary Examiner*—James M Hewitt
(74) *Attorney, Agent, or Firm*—Wenderoth, Lind & Ponack, L.L.P.

(57) ABSTRACT

A coupling structure for a pipe having an enhanced sealing property for a bellows-type pipe. The coupling structure includes a tubular inner sealing portion that is formed from an elastic material. The tubular inner sealing portion has an abutment surface that is configured to abut against an inner circumference of the pipe. The coupling structure also includes a tubular outer sealing portion that is formed from an elastic material. The tubular outer sealing portion has an abutment surface that is configured to abut against an inner circumference of the pipe. An axial end of the tubular outer sealing portion is connected to the tubular inner sealing portion so as to enclose the end face of the pipe. The coupling structure is also provided with a fastener for holding both the tubular inner sealing portion and the tubular outer sealing portions radially inwardly and outwardly. The abutment surfaces of the tubular inner sealing portion and/or the tubular outer sealing portion are/is fabricated into wave form having concave sections and convex sections arranged alternately in an axial direction.

3 Claims, 5 Drawing Sheets

U.S. PATENT DOCUMENTS

| | | | | |
|---|---|---|---|---|
| 4,909,547 A | * | 3/1990 | Guy | 285/148.28 |
| 5,039,137 A | * | 8/1991 | Cankovic et al. | 285/236 |
| 5,042,844 A | * | 8/1991 | Iida et al. | 285/7 |
| 5,486,023 A | * | 1/1996 | Sanders et al. | 285/258 |
| 6,209,929 B1 | * | 4/2001 | Ikegami et al. | 285/139.2 |
| 6,267,415 B1 | * | 7/2001 | Frank | 285/255 |
| 7,083,204 B1 | * | 8/2006 | Miller et al. | 285/293.1 |

FOREIGN PATENT DOCUMENTS

JP  2000-074281  3/2000

* cited by examiner

COUPLING STRUCTURE FOR PIPE END

BACKGROUND OF THE INVENTION

1. Field of the Invention

The present invention relates to a coupling structure for a pipe end, and in particular to a coupling structure for a pipe having concave sections and convex sections alternately in an axial direction disposed on at least one side of an inner circumference and an outer circumference.

2. Description of the Related Art

For an engine of, for example, four-wheel work vehicles an air intake duct is employed to connect between an air intake case of a carburetor and an air cleaner, the air intake duct being fabricated from a flexible bellows-type pipe for free arrangement within an engine room.

Figure 5:
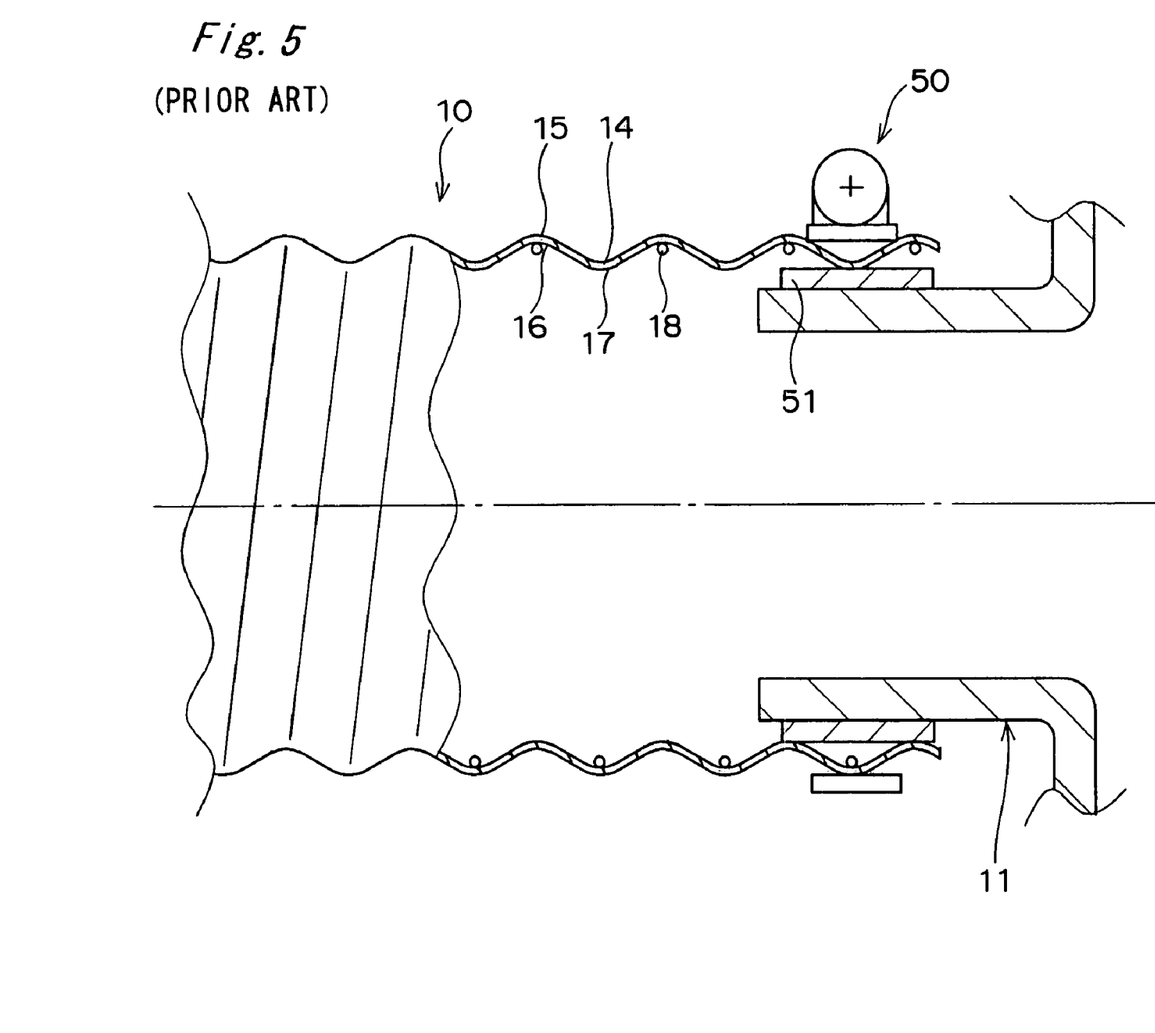
FIG. 5 is a sectional view of a coupling structure for a pipe end in accordance with the prior art.

As shown in FIG. 5, the bellows-type pipe 10 is fabricated into a form having helical corrugations 14, 15, 16, 17 on an outer circumference and an inner circumference and a helical core 18 is disposed at the bottoms of the concave sections 16 of the inner circumference.

Heretofore, for joining the air intake duct comprising the bellows-type pipe 10 to a receiving part of the air cleaner and the like, a rubber seal 51 is fit around the outer circumference of a pipe 11 on the side of the receiving part, the bellows-type pipe 10 is fit over an outer circumference of the seal 51, and then a clamp 50 is mounted to fasten the bellows-type pipe 10 from its outer circumference.

According to the prior art as shown in FIG. 5, since the outer circumference of the bellows-type pipe 10 is directly pressed by the clamp 50, a stable sealing property is difficult to secure. Also, because of the helically wound core 18, an end face of the bellows-type pipe 10 becomes uneven and a part of the end face of the bellows-type pipe 10 projects outwardly (for example, refer to a projection 10A in FIG. 2). As above described, the construction as shown in FIG. 5 exposes the end face of the bellows-type pipe 10 resulting in deterioration of an esthetic view.

On the other hand, JP-A-2000-74281 discloses a coupling structure for use with a pipe provided with helical corrugations on an outer circumference of the pipe. According to this art, a tubular nipple is fit onto an inner circumference of the pipe, an elastic packing having helical corrugations on its inner circumference is fit about the outer circumference of the pipe, and then a holder is mounted to fasten from the outer circumference of the elastic packing.

The art as disclosed in JP-A-2000-74281 may be useful in its own way with respect to a pipe having a smooth tubular inner circumference, however, cannot be applied to a so-called bellows-type pipe having corrugations both on the inner and the outer circumferences.

SUMMARY OF THE INVENTION

The present invention addresses the above described condition, and an object of the present invention is to provide a coupling structure for a pipe end which can enhance a sealing property and maintain an esthetic view of the pipe end even if a so-called bellows-type pipe is employed.

In order to achieve the object mentioned above, in accordance with an aspect of the present invention, there is provided a coupling structure for a pipe end comprising: a tubular inner sealing portion formed from an elastic material and having an abutment surface against an inner circumference of the pipe; a tubular outer sealing portion formed from an elastic material and having an abutment surface against an outer circumference of the pipe, an axial end of the outer sealing portion being connected to the inner sealing portion so as to enclose an end of the pipe; and a fastener for holding and fastening the pipe and the inner and the outer sealing portions both from radially inwardly and outwardly; wherein the abutment surface of the inner sealing portion and/or the abutment surface of the outer sealing portion are/is fabricated into wave form having concave sections and convex sections arranged alternately in an axial direction.

According to this arrangement, even if a so-called bellows-type pipe is employed as the pipe, the concave sections and the convex sections formed on the abutment surface of the inner sealing portion and/or the outer sealing portion can be abutted closely against concave sections and convex sections of the so-called bellows-type pipe and the fastener can hold and strongly fasten the pipe and the inner and the outer sealing portions both from radially inwardly and outwardly. This arrangement enables to enhance a sealing property. Furthermore, because the pipe is fastened by way of the inner sealing portion and the outer sealing portion rather than fastening the pipe directly by the fastener, it is possible to obtain a stable sealing property. Also, as the inner sealing portion and the outer sealing portion are connected so as to enclose the end of the pipe, the end of the pipe can not be exposed outside and the esthetic view can not be impaired.

Preferably, the abutment surface of the outer sealing portion may be fabricated into the wave form. According to this arrangement, the sealing property can be enhanced in both cases in which the pipe having the concave sections and the convex sections on an inner circumference and an outer circumference is employed and the pipe having the concave sections and the convex sections only on an outer circumference is employed.

Preferably, the concave sections and convex sections may assume helical forms consecutive in a circumferential direction and in an axial direction. In accordance with this structure, through threading the helical corrugations of the inner sealing portion and/or the outer sealing portion with the bellows-type pipe, it is possible to facilitate the assembly of them when the bellows-type pipe is provided with helical corrugations, Preferably, the fastener may comprise an inner ring positioned at a radially inner side of the inner sealing portion and having hardness larger than that of the outer and the inner sealing portions, and an outer clamp mounted at a radially outer side of the outer sealing portion and being capable to reduce its internal diameter. This arrangement enables to prevent distortion of the inner and the outer sealing portions as well as the bellows-type pipe in association with the reduction in diameter of the outer clamp because of the presence of the inner ring and to stabilize their configurations. Therefore, the inner and the outer sealing portions enable to secure a stable sealing property.

BRIEF DESCRIPTION OF THE DRAWINGS

This and other objects and features of the present invention will become more clear from the following description taken in conjunction with a preferred embodiment thereof with reference to the accompanying drawings.

DRTAILED DESCRIPTION OF THE PREFERED EMBODIMENT

First Embodiment

Figure 1:
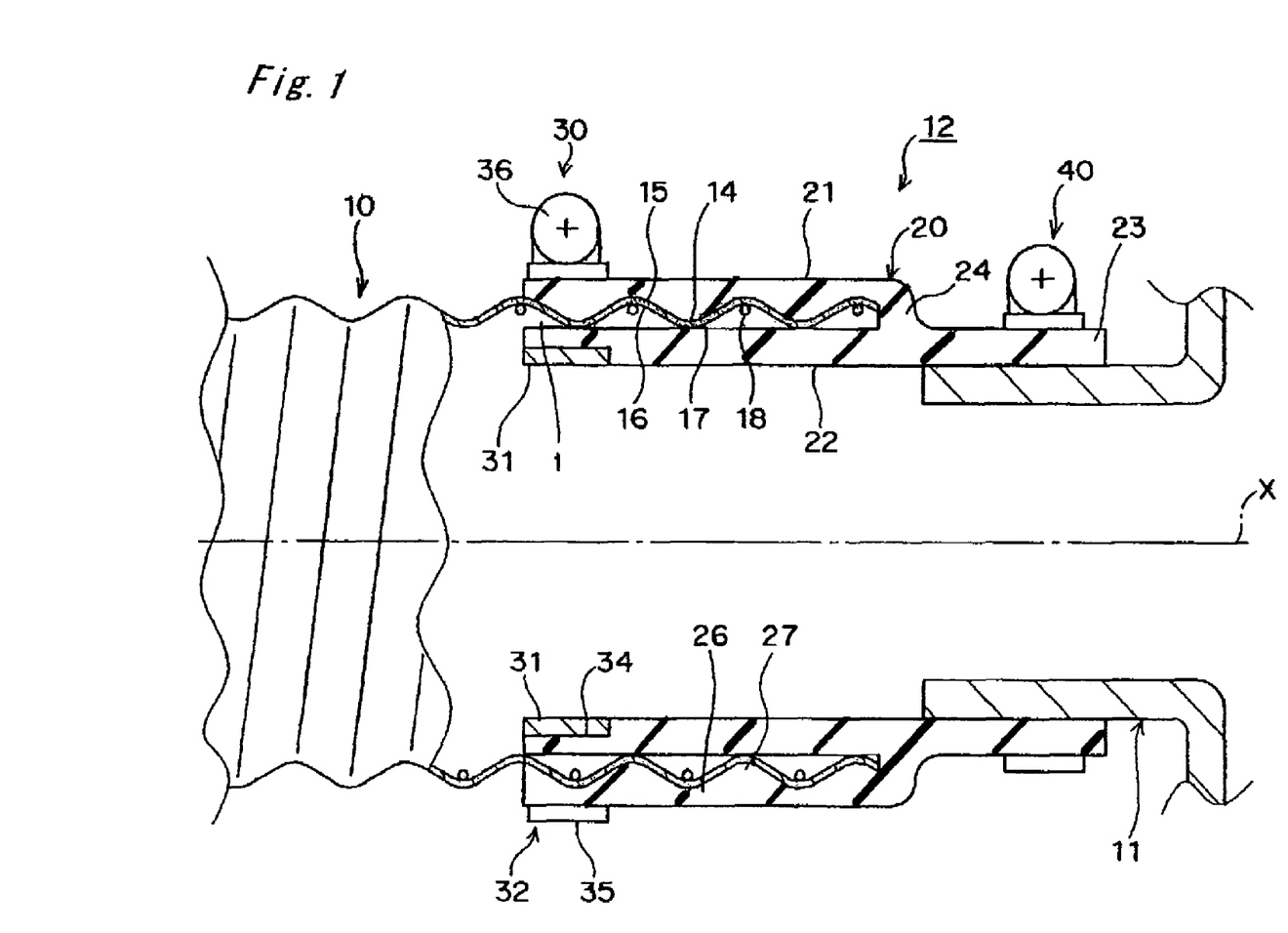
FIG. 1 is a sectional view of a coupling structure for a pipe end in accordance with a first embodiment of the present invention.
Figure 2:
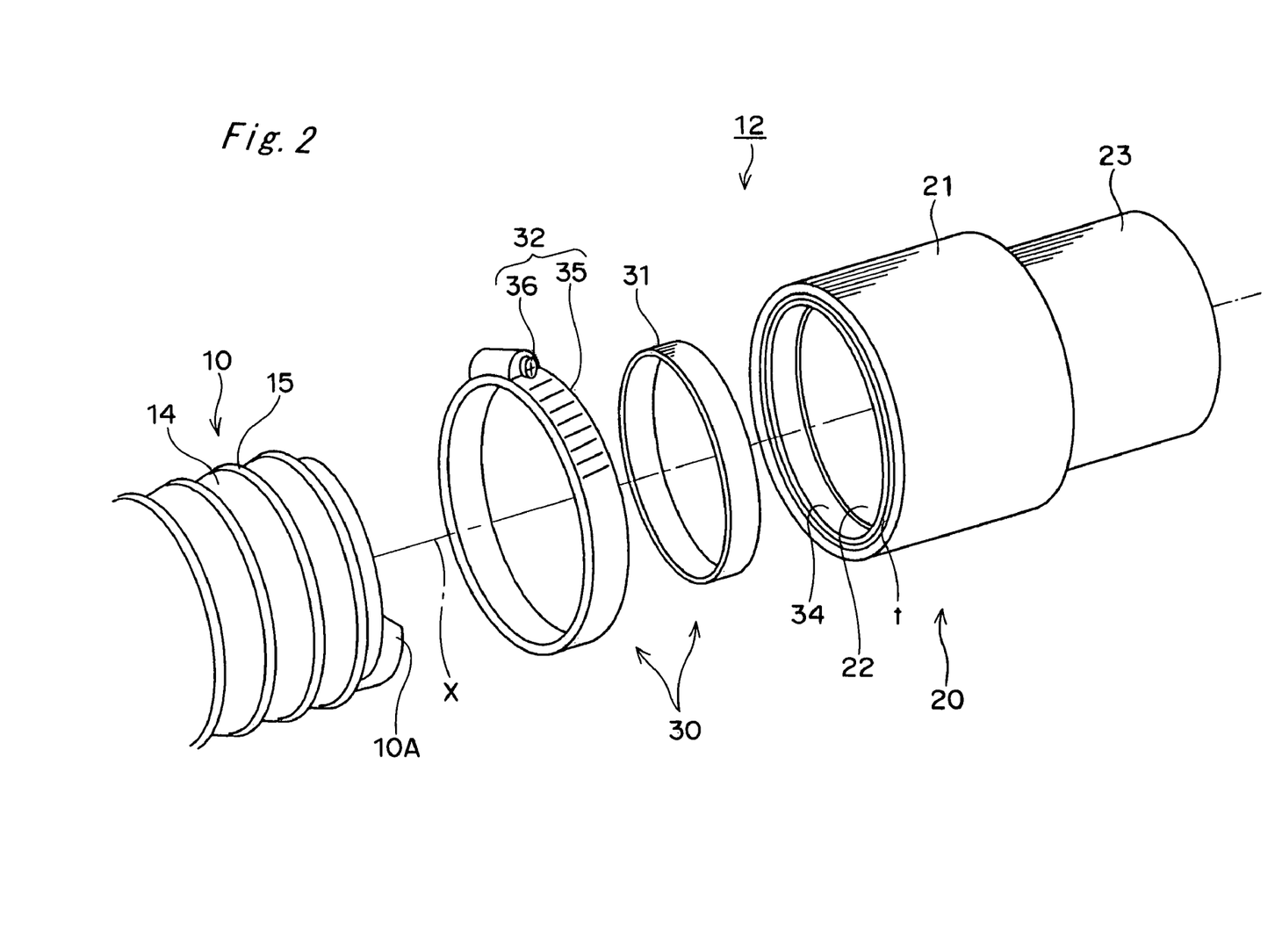
FIG. 2 is an exploded perspective view of the coupling structure in FIG. 1.

FIG. 1 is a sectional view of a coupling structure for a pipe end in accordance with a first embodiment of the present invention. This shows a condition in which an end of a bellows-type pipe 10 is coupled to a receiving pipe 11 by way of a coupler 12. FIG. 2 is an exploded perspective view of the coupling structure in FIG. 1.

The bellows-type pipe 10 is utilized, for example, for an air intake duct accompanied with an engine. In this case, one end of the bellows-type pipe 10 is connected to an air cleaner mounted on a vehicle body and the other end is connected to an air intake case mounted on the engine, and for connection of each of the ends of the bellows-type pipe 10 the coupler 12 in accordance with this embodiment is utilized.

An outer circumference and an inner circumference of the bellows-type pipe 10 are configured into wave forms having concave sections 14, 16 and convex sections 15, 17 disposed alternately in an axial direction. More specifically, the concave sections 14, 16 and the convex sections 15, 17 maintain a parallel relationship each other and are fabricated into a helical form consecutive in a circumferential direction and in the axial direction, respectively. As shown in FIG. 1, a core 18 formed from a steel wire and the like is helically disposed at the bottoms of the concave sections 16 on the inner circumference of the bellows-type pipe 10.

The coupler 12 comprises a coupler body 20 and a fastener 30. The coupler body 20 formed from an elastic material such as synthetic rubber and the like comprises an outer sealing portion 21 located radially outward of the end of the bellows-type pipe 10, an inner sealing portion 22 located radially inward of the end of the bellows-type pipe 10, and an interconnecting portion 23 for connection to the receiving pipe 11.

The outer sealing portion 21, the inner sealing portion 22, and the interconnecting portion 23 are fabricated into a tubular form, respectively, and disposed on a common axis X. The outer and the inner sealing portions 21, 22 are disposed at one side of the coupler body 20 in an axial direction and the interconnecting portion 23 is disposed axially at the other side of the coupler body 20.

The inner sealing portion 22 and the interconnecting portion 23 have equal internal and external diameters to form a single tubular and axially continuous body. The outer sealing portion 21 has an internal diameter larger than an external diameter of the inner sealing portion 22 and an axial length substantially equal to that of the inner sealing portion 22, and is spaced apart radially outward of the inner sealing portion 22 with a clearance t. The outer sealing portion 21 has a junction 24 bent radially inwardly at an axially intermediate position of the coupler 12, the junction 24 being bonded to the inner sealing portion 22. The inner sealing portion 22 and the interconnecting portion 23 may be formed so as to have different internal or external diameters rather than having same internal and external diameters, and also the outer sealing portion 21 and the interconnecting portion 23 may have same internal diameters or same external diameters.

The clearance t is open at an outer end of the coupler body 20 in the axial direction and is closed at the axially intermediate position of the coupler body 20 by the junction 24. The bellows-type pipe 10 is designed to be inserted into the space between the outer and the inner sealing portions 21, 22 from the open area of the clearance t.

The inner circumference of the outer sealing portion 21 is fabricated into a wave form having concave sections 26 and convex sections 27 disposed alternately in the axial direction. More specifically, the concave sections 26 and the convex sections 27 are fabricated into a helical form consecutive in a circumferential direction and the axial direction, respectively. The concave and the convex sections (corrugations) 26, 27 are formed corresponding to the concave and the convex sections (corrugations) 14, 15 formed on the outer circumference of the bellows-type pipe 10. More specifically, the concave and the convex sections 26, 27 and the corrugations 14, 15 are fabricated into a substantially same configuration. The outer circumference of the inner sealing portion 22 is fabricated into a smooth (without corrugations) cylindrical form.

The fastener 30 is employed to fix the coupler body 20 to the bellows-type pipe 10 through holding and fastening the outer and the inner sealing portions 21, 22 as well as the bellows-type pipe 10 both from the inside and the outside in a radial direction. The fastener 30 comprises an inner ring 31 mounted on the inner circumference of the inner sealing portion 22 and an outer clamp 32 mounted on the outer circumference of the outer sealing portion 21.

The inner ring 31 is an annular ring formed from a metal or a synthetic resin and has hardness larger than that of at least the outer and the inner sealing portions 21, 22. The inner ring 31 is fit into a recess 34 formed at the end of the inner circumference of the inner sealing portion 22. The outer clamp 32 is a so-called hose band. The diameter of the outer clamp 32 may be reduced by winding a belt 35 about the outer circumference of the outer sealing portion 21 and by tightening a bolt 36. The recess 34 may be omitted, in this case, the inner ring 31 may be directly fitted or attached to the inner circumference of the inner sealing portion 22.

Now, the process for mounting the coupler 12 having above configurations onto the end of the bellows-type pipe 10 will be explained. First of all, the end of the bellows-type pipe 10 is inserted into the clearance t between the outer and the inner sealing portions 21, 22 and the helical corrugations 14, 15 on the outer circumference of the bellows-type pipe 10 are threaded with the helical corrugations 26, 27 (the concave sections 26 and the convex sections 27) on the inner circumference of the outer sealing portion 21. Then, the outer clamp 32 is wound about the outer circumference of the outer sealing portion 21 and the diameter of the outer clamp 32 is reduced. Therefore, the outer and the inner sealing portions 21, 22 as well as the bellows-type pipe 10 are compressed radially inwardly between the outer clamp 32 and the inner ring 31. The corrugations 14, 15, 16, 17 of the bellows-type pipe 10 are pressed partially strongly against the outer and the inner sealing portions 21, 22 through tightening the fastener 30 resulting in substantially a depressed form.

An adhesive or a filler may be injected into the space between the outer circumference of the inner sealing portion 22 and the inner circumference of the bellows-type pipe 10.

The interconnecting portion 23 is mounted on the outer circumference of the receiving pipe 11 and is fastened by a clamp 40 positioned about the interconnecting portion 23 for connection to the receiving pipe 11.

A sealing structure adapted the coupler 12 assumes following functions and effects:

(1) Because the inner circumference of the outer sealing portion 21 fabricated into the wave form with the corrugations 26, 27 abuts closely against the outer circumference of the bellows-type pipe 10 with the corrugations 14, 15, the sealing property can be enhanced.

(2) Because the outer and the inner sealing portions 21, 22 as well as the bellows-type pipe 10 are held and fastened from both the inside and the outside in the radial direction by the fastener 30, tight fastening can be attained, and deformation of the bellows-type pipe 10 and the sealing portions 21, 22 in tightening the outer clamp 32 can be prevented due to the presence of the inner ring 31, thereby providing the stable sealing property.

(3) Because the bellows-type pipe 10 is pressed against the outer and the inner sealing portions 21, 22 rather than fastening it directly by the fastener 30, the stable sealing property can be more easily obtained.

(4) Because the end of the bellows-type pipe 10 is enclosed completely by the junction 24 between the outer and the inner sealing portions 21, 22 and no part thereof is exposed outside, the esthetic view can be maintained.

(5) Assembling the bellows-type pipe 10 and the coupler 12 is simple because no more work is necessary than the threading the bellows-type pipe 10 with the coupler 12 and the fastening by the fastener 30.

(6) Because the recess 34 formed in the inner sealing portion 22 receives the inner ring 31, the inner ring 31 can be positioned properly.

(7) Even when the external diameter of the receiving pipe 11 is changed, there is no need to replace the bellows-type pipe 10 with a new one having a different diameter, and what is required is only to revise the internal diameter of the interconnecting portion 23. The coupler 12 is versatile in its application and can accommodate the receiving pipe 11 having various external dimensions.

Second Embodiment

Figure 3:
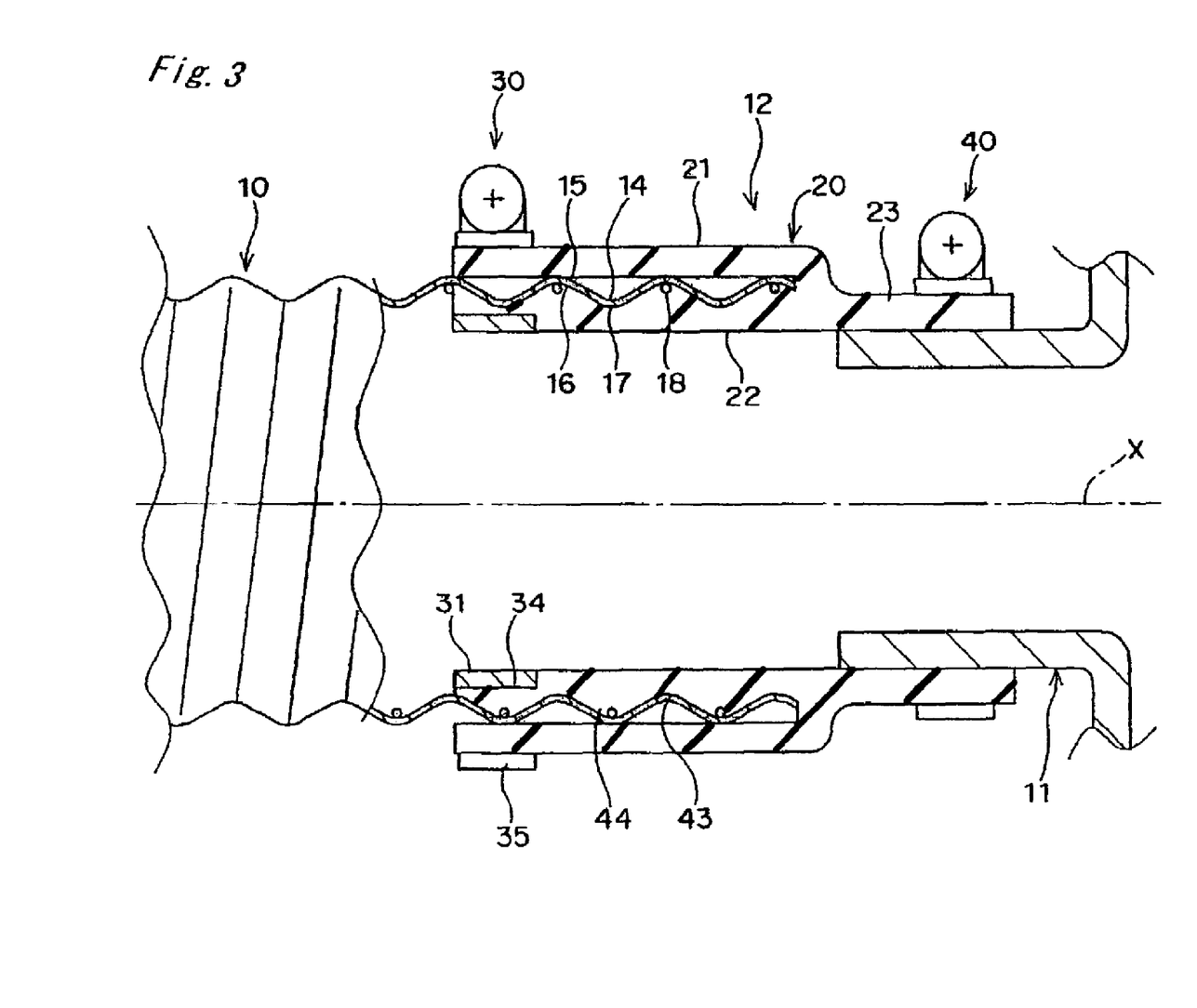
FIG. 3 is a sectional view of a coupling structure for a pipe end in accordance with a second embodiment of the present invention.

FIG. 3 is a cross section of a sealing structure in accordance with a second embodiment of the present invention. In this embodiment, the outer circumference of the inner sealing portion 22 is fabricated into a wave form having alternate concave sections 43 and convex sections 44 in an axial direction for close abutment against the inner circumference of the bellows-type pipe 10. The inner circumference of the outer sealing portion 21 is a smooth (without corrugations) tubular surface. This embodiment assumes functions and effects similar to those of the first embodiment.

Third Embodiment

Figure 4:
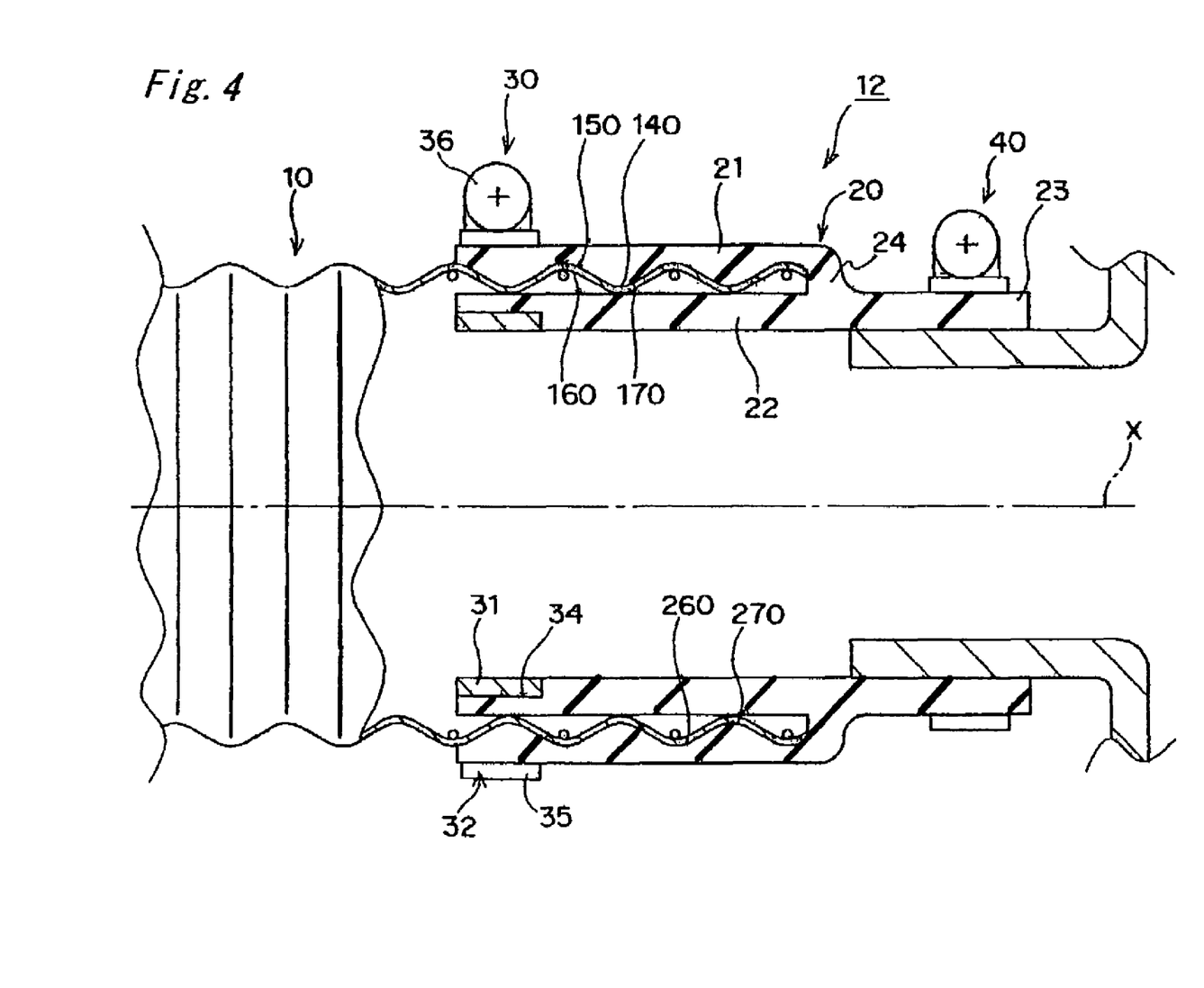
FIG. 4 is a sectional view of a coupling structure for a pipe end in accordance with a third embodiment of the present invention.

FIG. 4 is a cross section of a sealing structure in accordance with a third embodiment of the present invention. In this embodiment, a number of corrugations 140, 150, 160, 170 of the bellows-type pipe 10 are fabricated into annular forms, each forming one complete turn around the periphery of the bellows-type pipe 10 in which the number of corrugations 140, 150, 160, 170 are separated from each other axially rather than the helical consecutive corrugations 14, 15, 16, 17 of the first embodiment. Corresponding to this arrangement, a plurality of annular corrugations 260, 270 are formed on the inner circumference of the outer sealing portion 21 such that each of the plurality of annular corrugations 260, 270 is formed as one complete turn, and the plurality of annular corrugations 260, 270 are separated from each other in the axial direction.

With respect to the bellows-type pipe 10 for the third embodiment, a coupler body 20 provided with corrugations on the outer circumference of the inner sealing portion 22 may be applied.

Other Embodiments

The present invention may be embodied, for example, in configurations, as follows:

(1) Both the inner circumference of the outer sealing portion 21 and the outer circumference of the inner sealing portion 22 can be fabricated into wave forms.

(2) The inner ring 31 is required to have hardness at least larger than that of the outer and the inner sealing portions 21, 22. Therefore, it is possible to form the inner ring 31 from a hard rubber material. In this case, the inner ring 31 and the inner sealing portion 22 can be formed integrally.

(3) The corrugations formed on the outer sealing portion 21 or the inner sealing portion 22 may have sizes same with or different from those of the corrugations on the bellows-type pipe 10. For example, the opposing corrugations may have same pitches, but different heights (depths) or different forms of the corrugations. Even in this case, through tightening the fastener the opposing corrugations closely contact.

(4) The present invention can be adapted not only to an air intake duct for engines but also to any pipe (bellows-type pipe) including a suction hose for cleaners, a discharge hose for washing machines, and the like. The inner circumference of such pipes may be a smooth surface having no corrugations.

(5) The coupler 12 in accordance with the present invention may be formed integrally with a receiving part (receiving pipe 11).

Although the invention has been described in its preferred embodiments with a certain degree of particularity, obviously many changes and variations are possible therein. It is therefore to be understood that the present invention may be practical otherwise than as specifically described herein with out departing from the scope and spirit thereof.

What is claimed is:

1. A coupling structure for use with a pipe, the coupling structure comprising:
   a tubular inner sealing portion formed from an elastic material, the tubular inner sealing portion having an abutment surface configured to abut against an inner circumference of the pipe;
   a tubular outer sealing portion formed from an elastic material, the tubular outer sealing portion having
      an abutment surface configured to abut against an outer circumference of the pipe, and
      an axial end of the tubular outer sealing portion being connected to the tubular inner sealing portion so as to enclose an end of the pipe; and
   a fastener for holding and fastening the pipe to the tubular inner sealing portion and the tubular outer sealing portion in a radially inward direction and a radially outward direction respectively,
   wherein one of an inner circumference of the tubular outer sealing portion and an outer circumference of the tubular inner sealing portion is fabricated into wave form having concave sections and convex sections arranged alternately in an axial direction, and another of the them is fabricated into a smooth cylindrical form,
   wherein the concave sections and convex sections are fabricated into helical forms in a circumferential direction, and
   wherein the fastener comprises an inner ring that is fit into a recess formed on an end portion of the inner circumference of the tubular inner sealing portion, the end portion being on an opposite side in the axial direction from a junction connecting the tubular outer sealing portion and the tubular inner sealing portion.

2. The coupling structure as claimed in claim 1, wherein
the pipe has a helical core disposed on an inner surface of the pipe,
the inner circumference of the tubular outer sealing portion is fabricated into wave form,
the outer circumference of the tubular inner sealing portion is fabricated into a smooth cylindrical form, and
the outer circumference of the tubular inner sealing portion is configured to face the helical core disposed on the inner surface of the pipe.

3. The coupling structure as claimed in claim 2, wherein
the pipe has concave sections,
the core is disposed at bottoms of the concave sections of the inner circumference of the pipe,
the tubular outer sealing portion and the tubular inner sealing portion are configured to receive the pipe having the concave sections and the convex sections.

* * * * *